United States Patent [19]
Angelo et al.

[11] Patent Number: 6,119,228
[45] Date of Patent: Sep. 12, 2000

[54] METHOD FOR SECURELY COMMUNICATING REMOTE CONTROL COMMANDS IN A COMPUTER NETWORK

[75] Inventors: Michael F. Angelo, Houston; David L. Collins, Magnolia; Donald D. Kim, Houston; Kenneth A. Jansen, Spring, all of Tex.

[73] Assignee: Compaq Computer Corporation, Houston, Tex.

[21] Appl. No.: 08/916,273

[22] Filed: Aug. 22, 1997

[51] Int. Cl.$^7$ ....................................................... H02J 13/00
[52] U.S. Cl. ......................... 713/180; 713/176; 713/178; 380/255
[58] Field of Search .................................. 713/180, 176, 713/178; 380/255, 280

[56] References Cited

U.S. PATENT DOCUMENTS

| | | |
|---|---|---|
| 4,405,829 | 9/1983 | Rivest et al. . |
| 4,799,258 | 1/1989 | Davies . |
| 5,150,407 | 9/1992 | Chan . |
| 5,198,806 | 3/1993 | Lord .................................... 340/825.31 |
| 5,210,795 | 5/1993 | Lipner et al. . |
| 5,315,658 | 5/1994 | Micali . |
| 5,359,660 | 10/1994 | Clark et al. . |
| 5,502,766 | 3/1996 | Boebert et al. ............................ 380/25 |
| 5,511,122 | 4/1996 | Atkinson . |
| 5,577,209 | 11/1996 | Boyle et al. ........................ 340/825.31 |
| 5,590,199 | 12/1996 | Krajewski, Jr. et al. . |
| 5,652,892 | 7/1997 | Ugajin ..................................... 395/750 |
| 5,666,415 | 9/1997 | Kaufman . |
| 5,864,683 | 1/1999 | Boebert et al. ..................... 395/200.79 |

FOREIGN PATENT DOCUMENTS

| | | |
|---|---|---|
| 95/19595 | 7/1995 | WIPO . |
| 96/13106 | 2/1996 | WIPO . |

OTHER PUBLICATIONS

Advanced Micro Devices (AMD), *Implementation of Magic Packet™–Ready Motherboard*, Apr. 1997, pp. 1–14, Publication#to 21383, Rev: B, Amendment/0.

Schneier, Bruce, *Applied Cryptography Protocols, Algorithms, and Source Code in C*, Copyright 1996, pp. 1–74, Second Edition.

Stoenner, David, Advanced Micro Devices (AMD), *Magic Packet™ Technology Application in Hardware and Software*, Mar. 1996, pp. 1–28, Publication# 20381, Rev: A, Amendment/0.

Gibson, Glen, Advanced Micro Devices (AMD), *Magic Packet™ Technology*, Nov. 1995, pp. 1–5, Publication# 20213, Rev: A, Amendment/0.

(List continued on next page.)

*Primary Examiner*—Thomas R. Peeso
*Attorney, Agent, or Firm*—Akin, Gump, Strauss, Hauer & Feld, LLP

[57] ABSTRACT

A method for providing secure remote control commands in a distributing computer environment. In the preferred embodiment of the invention, a network administrator or network management software creates a shutdown record, including an index or time stamp, for powering down a specified network computer(s). Prior to broadcast over the network, a secure one-way hash function is performed on the shutdown record. The result of the one-way hash function is encrypted using the network administrator's private key, thereby generating a digital signature that can be verified by specially configured network nodes. The digital signature is appended to the original shutdown record prior to broadcast to the network. Upon receiving the broadcast message, the targeted network computer(s) validates the broadcast message by verifying the digital signature of the packet or frame. The validation process is performed by decrypting the hash value representation of the shutdown record using the network administrator's public key. A one-way hash function is also performed on the original shutdown record portion of the received message. If the two values match, the broadcast message is determined to be authentic and the shutdown control code is executed. The invention insures that the shutdown command was neither modified in transit nor originated from an unauthorized source.

53 Claims, 4 Drawing Sheets

OTHER PUBLICATIONS

AMD, *Magic Packet™ Technology*, Copyright 1997, pp. 1–2.

Interex—Latest Hewlett–Packard News, *HP Introduces "Industry's Most Manageable" Network–Ready PC*, Posted Feb. 28, 1996, pp. 1–4.

Proven Solutions, Inc., *IBM PC Networking Tools for the IBM Personal Computer*, Copyright 1997, pp. 1–6.

AMD News Release, *AMD Exhibits Award–Winning Technology at PC 96*, Oct. 3, 1996, Page 1 of 2.

AMD News Release, *AMD and HP Team to Deliver "Magic Packet™" for Remote Wake Up of Networked Green PCs*, Mar. 27, 1995, pp. 1–2.

*European Search Report*, Application No. EP 98 30 6483, European Patent Office, mailed Jan. 11, 2000, 2 pages.

METHOD FOR SECURELY COMMUNICATING REMOTE CONTROL COMMANDS IN A COMPUTER NETWORK

BACKGROUND OF THE INVENTION

1. Field of the Invention

The invention relates to security in a computer network, and more particularly to a secure method for communicating remote control commands in a distributed computing environment.

2. Description of the Related Art

A majority of today's businesses utilize some form of computer network. As servers and clients are deployed into more mission critical environments and used in more remote areas, the amount of human resources required to manage these computer networks is growing. Computer networks are often maintained by either a network administrator or an Information Systems (IS) department. Network administrators are often tasked with performing such duties as data backups or software updates on network computers at times when network users will not be negatively impacted (e.g., at night). These tasks are simplified somewhat by relatively new network management hardware and software that allows remote access to network computers. To remotely access network computers, however, requires that network users leave machines running or disable energy saving features. This requirement can conflict with efforts to reduce computer power consumption.

In particular, the Environmental Protection Agency (EPA) has attempted, through the Energy Star Program, to reduce computer power consumption via the creation of so-called "green" computers. The term "green computer" typically refers to a computer that enters low-power mode following a specified period of inactivity. The proliferation of green computers in networks, while laudable, can interfere with a network administrator's duties. For example, if a network computer is in sleep mode (or other low power state) it often cannot be addressed from the network.

Attempts have been made to alleviate this problem. For example, Magic Packet™ technology, a proposed industry standard jointly developed by Advanced Micro Devices and Hewlett-Packard Corporation, provides a mechanism whereby a network administrator or network management software can "wake up" or power down a network computer by sending it a special Ethernet frame. Briefly, the Ethernet frame includes a specific data pattern that can be detected by a specially configured network interface controller incorporated in a network computer. The network interface controller is capable of communicating with the network computer's power management hardware or software to power up or power down the network computer in response to a control code portion of the special Ethernet frame.

In addition to networking hardware and software, today's businesses also invest large amounts of money developing information contained in data files such as text documents and spreadsheets. Protecting such investments can be critical to the success and reputation of a business. Public accounts of the exploits of computer "hackers"—as malicious codebreakers or eavesdroppers are sometimes called—have therefore focused and magnified corporate desires for secure communications and better methods of protecting data. The scope of the problem is undoubtedly even more serious than reported, given the reluctance of many businesses to publicize security breaches. As a result, computer manufacturers and network software developers are striving to incorporate security and integrity features into their products to restrict access to data contained on network hard drives, as well as information contained in other critical network components.

One known approach to security involves encryption or cryptography. Cryptography is typically used to protect both data and communications. Generally, an original message or data item is referred to as "plain text", while "encryption" denotes the process of disguising or altering a message in such a way that its substance is not readily discernable. An encrypted message is sometimes called "ciphertext". Ciphertext is returned to plain text by an inverse operation referred to as "decryption". Encryption is typically accomplished through the use of a cryptographic algorithms which is essentially a mathematical function. The most common cryptographic algorithms are key-based, where special knowledge of variable information called a "key" is required to decrypt ciphertext. There are many types of key-based cryptographic algorithms, providing varying levels of security.

The two most prevalent cryptographic algorithms are generally referred to as "symmetric" (also called secret key or single key algorithms) and "public key" (also called asymmetric algorithms). The security in these algorithms is centered around the keys—not the details of the algorithm itself. This makes it possible to publish the algorithm for public scrutiny and then mass produce it for incorporation into security products.

In symmetric algorithms, the encryption key and the decryption key are the same. This single key encryption arrangement is not without drawbacks. The sender and recipient of a message must somehow exchange information regarding the secret key. Each side must trust the other not to disclose the key. Further, the sender must generally communicate the key via another media (similar to a bank sending the personal identification number for an ATM card through the mail). This arrangement can be impractical, for example, when the parties interact electronically for the first time over a network. The number of keys also increases rapidly as the number of users increases.

With public key algorithms, by comparison, the key used for encryption is different from the key used for decryption. It is generally very difficult to calculate the decryption key from an encryption key. In typical operation, the "public key" used for encryption is made public via a readily accessible directory, while the corresponding "private key" used for decryption is known only to the recipient of the ciphertext. In an exemplary public key transaction, a sender retrieves the recipient's public key and uses it to encrypt the message prior to sending it. The recipient then decrypts the message with the corresponding private key. It is also possible to encrypt a message using a private key and decrypt it using a public key. This is sometimes used in digital signatures to authenticate the source of a message.

The number of cryptographic algorithms is constantly growing. The two most popular are DES (Data Encryption Standard) and RSA (named after its inventors—Rivest, Shamir, and Adleman). DES is a symmetric algorithm with a fixed key length. RSA is a public key algorithm that can be used for both encryption and digital signatures. DSA Digital Signature Algorithm) is another popular public key algorithm that is only used for digital signatures. With any of these algorithms, the relative difficulty of breaking an encrypted message by guessing a key with a brute force attack is proportional to the length of the key. For example, if the key is 40 bits long (5 characters), the total number of possible keys ($2^{40}$) is about 110 billion. Given the computational power of modern computers, this value is often considered inadequate. By comparison, a key length of 56 bits (7 characters) provides 65,636 times as many possible values as the 40 bit key.

One problem with key-based algorithms is speed. Public key algorithms, in particular, are typically on the order of 1,000 times slower than symmetric algorithms. Even symmetric algorithms can be slow when compared with so-called "one-way functions" or "one-way hash functions".

Briefly, an ideal one-way hash function, denoted H(M), operates on an arbitrary-length block of text or message M The one-way hash function returns a fixed-length hash value, h, such that h=H(M), where h is of length m. One-way hash functions have special characteristics that make them one-way. Given M, for example, it is easy to compute h. Given h, it is impossible to reverse the hashing process and compute M such that H(M)=h. Further, it is impossible to find another message, M', such that H(M)=H(M'). In essence, the one-way hash function provides a "fingerprint" of M that is unique, and is therefore useful for purposes of authenticating the source of a message.

SUMMARY OF THE INVENTION

Briefly, a computer system according to the present invention provides a secure method for communicating remote control commands in a distributed computing environment. A potential problem with providing remote control capabilities in a computer network is that unauthorized users may broadcast shutdown or wake up commands to network nodes in an undesirable manner. A system according to the present invention addresses this concern.

According to the invention, a network administrator or network management software creates a shutdown (or other control command) record including an index or time stamp with the date and time on which the shutdown record was created. A secure one-way hash function is then performed on the shutdown record. The result of the one-way hash function is encrypted using the network administrator's private key, thereby generating a digital signature of the shutdown record that can be verified by network nodes using the network administrator's public key. The digital signature is appended to the original shutdown record prior to broadcast to the network.

Following detection of a broadcast message addressed to it, a network computer according to the invention is able to validate the broadcast message by verifying the digital signature of the packet or frame. In the disclosed embodiment, the validation process is performed by decrypting the hash value representation of the shutdown record using the network administrator's public key. A one-way hash function is also performed on the original shutdown record portion of the received message. If the two hash values match, the broadcast message is determined to be authentic and the shutdown control code is executed.

The present invention thereby protects and authenticates remote control commands transmitted via corporate networks, intranets and LANs. Unauthorized users and malicious software are prevented from turning off (or waking up) network computers or performing other unauthorized functions such as malicious alteration of ROM code. For machines in which it is desirable to disable remote control functionality, it is also contemplated that the public key of the network administrator can be invalidated such that the specified machine is incapable of detecting a valid broadcast message.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents and applications are hereby incorporated by reference:

Commonly-assigned U.S. Pat. application Ser. No. 08/866,721, entitled "A METHOD AND APPARATUS FOR ALLOWING ACCESS TO SECURED COMPUTER RESOURCES BY UTILIZING A PASSWORD AND EXTERNAL ENCRYPTION ALGORITHM", filed on Dec. 13, 1996;

Commonly-assigned U.S. Pat. application Ser. No. 08/774,809, entitled "SECURE TWO-PIECE USER AUTHENTICATION IN A COMPUTER NETWORK", filed on Dec. 31, 1996; and Commonly-assigned U.S. Pat. application Ser. No. 08/777,615, entitled "METHOD FOR SECURELY CREATING, STORING AND USING ENCRYPTION KEYS IN A COMPUTER SYSTEM", filed on Dec. 31, 1996.

Figure 1:
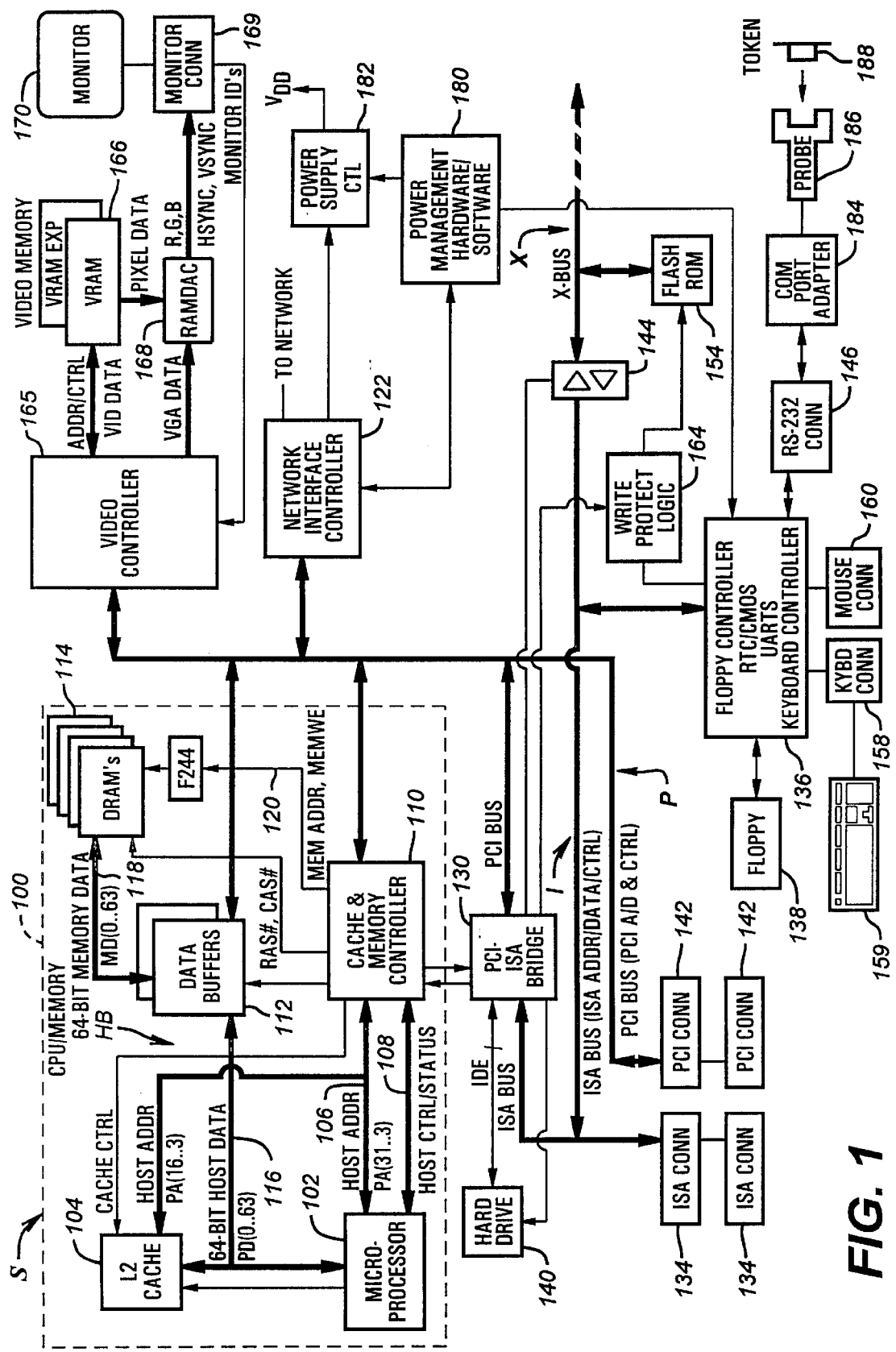
FIG. 1 is a schematic block diagram of a network computer system incorporating networking capabilities in accordance with the present invention.

Referring first to FIG. 1, a network computer system incorporating networking capabilities in accordance with the present invention is shown. In the preferred embodiment, the network computer S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the network computer S.

A CPU/memory subsystem 100 is connected to the PCI bus P. The processor 102 is preferably the Pentium® or Pentium II® processor from Intel Corporation, or any number of similar or next-generation processors. The processor 102 drives data, address, and control portions 116, 106, and 108 of a host bus HB. A level 2 (L2) or external cache memory 104 is connected to the host bus HB to provide additional caching capabilities that improve the overall performance of the network computer S. The L2 cache 104 may be permanently installed or may be removable if desired. Alternatively, the L2 cache 104 may be embodied within the 102. A cache and memory controller 110 and a PCI-ISA bridge chip 130 are connected to the control and address portions 108 and 106 of the host bus HB. The cache and memory controller chip 110 is configured to control a series of data buffers 112. The data buffers 112 are preferably the 82433LX from Intel, and are coupled to and drive the host data bus 116 and a MD or memory data bus 118 that is connected to a memory array 114. A memory address and memory control signal bus is provided from the cache and memory controller 110.

The data buffers 112, cache and memory controller 110, and PCI-ISA bridge 130 are all connected to the PCI bus P. The PCI-ISA bridge 130 is used to convert signals between the PCI bus P and the ISA bus I. The PCI-ISA bridge 130 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 140 is connected to the IDE interface of the PCI-ISA bridge 130. Tape drives, CD-ROM devices or other peripheral storage devices (not shown) can be similarly connected.

In the disclosed embodiment, the PCI-ISA bridge 130 also includes miscellaneous system logic. This miscellaneous system logic contains counters and activity timers as conventionally present in personal computer systems, an interrupt controller for both the PCI and ISA buses P and I, and power management logic. Additionally, the miscellaneous system logic preferably includes circuitry for a security management system used for password verification and to allow access to protected resources. For example, the PCI-ISA bridge 130 of the disclosed embodiment includes various address decode logic and security logic to control access to an internal or external CMOS/ memory (not shown) and stored password values. The CMOS/NVRAM memory is coupled to the PCI-ISA bridge 130 via a standard I²C bus (also not shown).

The PCI-ISA bridge 130 also includes circuitry to generate a firmware initiated SMI (System Management Interrupt), as well as SMI and keyboard controller interface circuitry. The miscellaneous system logic is connected to the flash ROM 154 through write protection logic 164. Separate enabler interrupt signals are also communicated from the PCI-ISA bridge 130 to the hard drive 140. Preferably, the PCI-ISA bridge 130 is a single integrated circuit, but other combinations are possible.

A series of ISA slots 134 are connected to the ISA bus I to receive ISA adapter cards. A series of PCI slots 142 are similarly provided on the PCI bus P to receive PCI adapter cards.

A video controller 165 is also connected to the PCI bus P. Video memory 166 is used to store graphics data and is connected to the video graphics controller 165 and a digital/analog converter (RAMDAC) 168. The video graphics controller 165 controls the operation of the video memory 166, allowing data to be written and retrieved as required. A monitor connector 169 is connected to the RAMDAC 169 for connecting a monitor 170.

A combination I/O chip 136 is connected to the ISA bus I. The combination I/O chip 136 preferably includes a real time clock, two UARTS, and a floppy disk controller for controlling a floppy disk drive 138. Additionally, a control line is provided to the read and write protection logic 164 to further control access to the flash ROM 154. Serial port connectors 146 and parallel port connector (not shown) are also connected to the combination I/O chip 136.

An 8042, or keyboard controller, is also included in the combination I/O chip 136. The keyboard controller is of conventional design and is connected in turn to a keyboard connector 158 and a mouse or pointing device connector 160. A keyboard 159 is connected to the network computer S through the keyboard connector 158.

A buffer 144 is connected to the ISA bus I to provide an additional X-bus X for various additional components of the network computer S. A flash ROM 154 receives its control, address and data signals from the X-bus X. Preferably, the flash ROM 154 contains the BIOS information for the computer system and can be remotely reprogrammed to allow for revisions of the BIOS.

In the disclosed embodiment, the network computer S contains circuitry for communicating with a removable cryptographic token 188. The token can take many forms, such as a Touch Memory™ device supplied by Dallas Semiconductor, Inc., a smart card, or an encryption card. The token 188 is easily decoupled from the network computer S and easily transportable by the token bearer. The token 188 preferably contains at least one of a variety of encryption algorithms (such as DES, Blowfish, elliptic curve-based algorithms, etc.). Although the base algorithm can be the same in each token 188, it is desirable that the encryption key be different in each token 188. Ideally, the token 188 is capable of communicating digitally with the network computer S during momentary contact with or proximity to the network computer S. The token 188 of the disclosed embodiment is capable of storing the encryption algorithm in a non-volatile manner and can be permanently write-protected to discourage tampering. Use of such tokens is further described in the previously incorporated patent application entitled "A METHOD AND APPARATUS FOR ALLOWING ACCESS TO SECURED COMPUTER RESOURCES BY UTILIZING A PASSWORD AND AN EXTERNAL ENCRYPTION ALGORITHM".

In the disclosed embodiment of the invention, the circuitry used for establishing a communication link between the token 188 and the network computer S consists of a probe 186 connected to a COM or serial port adapter 184. The port adapter 184 is connected to the RS232 connector 146. In operation, the token 188 is detachably received by the probe 186. The probe 186 includes circuitry for reading and writing memory in the token 188, and can be fully powered through the RS232 connector 146. In addition, the probe 186 includes presence detector circuitry for ascertaining the presence of a token 188.

Figure 2:
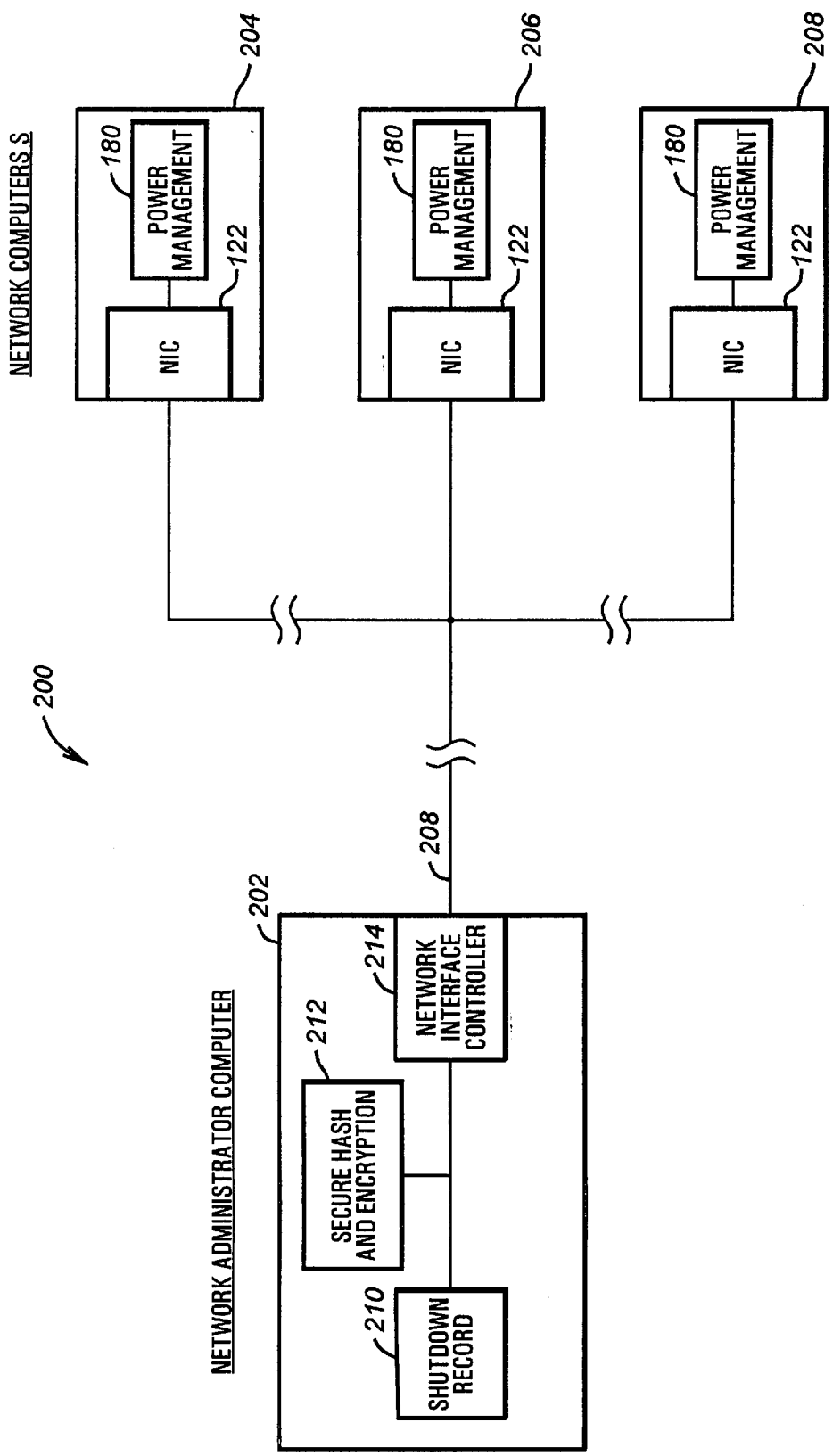
FIG. 2 is a schematic block diagram of an exemplary local area network capable of secure remote control communications according to the present invention.

A network interface controller (NIC) 122 incorporating remote control capabilities, such as those described more fully below, is also connected to the PCI bus P, allowing the network computer S to function as a "node" on a network. Preferably, the network interface controller 122 is a single integrated circuit that includes the capabilities necessary to act as a PCI bus master and slave, as well as circuitry required to act as an Ethernet interface. Attachment Unit Interface (AUI) and 10 base-T connectors (not shown) are provided in the system S, and are connected to the NIC 122 via filter and transformer circuitry. This circuitry forms a network or Ethernet connection for connecting the network computer S to a distributed computer environment or local area network (LAN) as shown in FIG. 2. The network interface controller 122 can be located on the motherboard and connected to a network via an RJ45 connector (not shown). This configuration is becoming more popular as Ethernet gains widespread acceptance for desktop networking.

Most of today's personal computers also incorporate some form of advanced power management hardware/software 180 (such as Compaq Power Management Software) for controlling power distribution from a power supply 182. The power management hardware/software 180 typically allows the network computer S to be placed in any one of a number of different power down states, from merely reducing processor clock speed to powering down everything except the network interface controller 122. In a typical computer system S, the power management hardware/software 180 scans for any one of several events that serve to wake up the system. Such events may include keyboard 159 keystrokes or mouse movement. A Magic Packet™ indication signal can easily be included among the specified wake-up or power down events.

The network interface controller 122 is supplied with power by an auxiliary portion of power source 182 and is capable of communicating with a network (see FIG. 2). Further, with the Magic Packet™ mode (discussed more fully below) enabled, the network interface controller 122 is capable of alerting the network computer's S power management hardware/software 180 following receipt of a valid Magic Packet™ frame. Conversely, the computer's power management hardware/software 180 is able to place the network interface controller 122 into Magic Packet™ mode prior to the computer system S entering a low power state. This can be accomplished, for example, by either setting a bit in an internal register or by driving a specified pin to a specified state. Once in Magic Packet™ mode, the network interface controller 122 no longer transmits frames, and scans all incoming frames addressed to it for a specific data sequence indicating that the frame is a Magic Packet™ frame. The Magic Packet™ frame must comply with the basic requirements of the chosen LAN technology, such as source address, destination address, and CRC.

The precise nature of the remote control networking mechanism is not considered critical to the invention and can take many forms, even within the confines of the Magic Packet™ standard. Most network interface controllers 122 already incorporate address matching circuitry to recognize regular frames address to the node. This circuitry can generally be adapted for use with the Magic Packet™ standard. Counter circuitry, in particular, may need to be added to the address matching circuitry.

It is noted that FIG. 1 presents an exemplary embodiment of the network computer S and it is understood that numerous other effective embodiments capable of operation in accordance with the present invention could readily be developed as known to those skilled in the art.

Referring now to FIG. 2, an exemplary distributed access environment capable of secure remote control communications according to the present is shown. The disclosed network 200 includes a network administrator computer 202 and a plurality of network computers S, depicted as network computers 204, 206 and 208. A network interface controller 214 of the network administrator computer 202 communicates with a network interface controller 122 in each of the network computers S. Components of the network 200 are coupled via a network connection 208. Although Magic Packet™ or similar technology is not limited to anyone particular type of network connection 208, a 10BASE-T, 100-BASE-T, or similar connection 208 is preferred.

Figure 3:
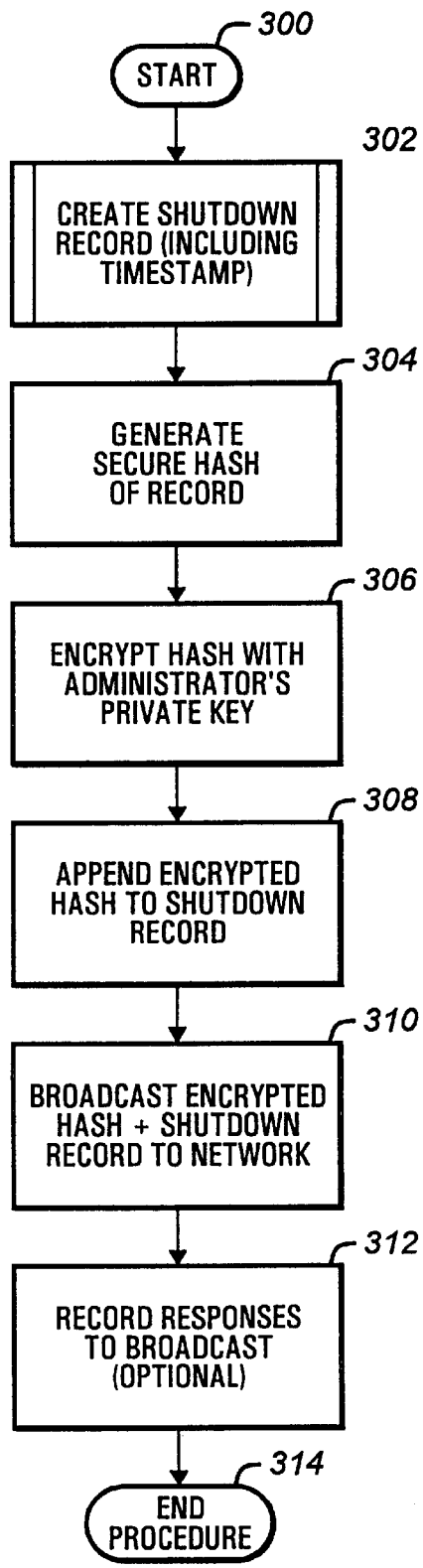
FIG. 3 is a flowchart diagram illustrating generation of a secure network broadcast message in accordance with the present invention.

As described more fully in conjunction with FIG. 3, when the network administrator desires to shut down or activate a particular network computer 204, 206, or 208, a shutdown record 210 is generated. Prior to communication over the network, a digital signature of the shutdown record is generated (at element 212). The digital signature is created by first performing a one-way hash function on the shutdown record, followed by encrypting the resulting value with the network administrator's private key. The digital signature is then appended to the shutdown record prior to broadcasting over the network via network interface controller 214.

The encryption algorithms utilized in element 212 can take many forms, including all of the aforementioned algorithms. The encryption processes are preferably carried out in secure memory that is not readable or writeable and cannot be "sniffed" by surreptitious programs or viruses having the ability to monitor and intercept processes running in normal memory. Such a memory configuration is disclosed, for example, in "METHOD FOR SECURELY CREATING, STORING AND USING ENCRYPTION KEYS IN A COMPUTER SYSTEM," previously incorporated by reference. It is also contemplated that the shutdown record itself could be similarly encrypted prior to broadcast over the network 200.

The network administrator computer 202 preferably includes network management software such as Compaq insight Manager. Such software solutions allow an administrator to control and interrogate multiple network computers S and download software (eg., updated ROM code) to network computers S while they are fully powered. The network management software may incorporate server- or client-based management data collection "agents" and allow network administrators to remotely track and update network node configurations throughout a network 200.

REMOTE CONTROL CAPABILITIES

In a system implemented according to the Magic Packet™ specification, a method is provided whereby a network administrator or network management software can remotely activate a sleeping network computer S. On the receiving side of the network 200, this is accomplished by enabling power to the network interface controller 122 of a particular network computer S even while the network computer S is in a low power state. The network interface controller 122 monitors the network 200 for a specific Ethernet frame. Each machine on the network is identified by a unique address. In the special Ethernet frame, the targeted network computer's S unique address is repeated sixteen times in a row anywhere within the data field of a valid network frame, serving as a wake-up call. This special frame is referred to as a Magic Packets™ frame.

As noted, the computer system S also includes power management hardware/software 180 that functions to apply power to the network interface controller 122 when Magic Packet™ mode is enabled. This process can be accomplished through BIOS or other software that is generally aware of the state of the system and capable of setting a bit in the network interface controller 122 to enable Magic Packet™ mode. Alternatively, a network operating system driver configured to monitor Advanced Power Management (APM) calls could be utilized to enable and disable Magic Packet™ mode.

Through the specialized hardware/software, the network interface controller 122 is also capable of signalling the power management hardware/software 180 to enable power to the network computer S following receipt of a valid Magic Packet™ frame. This signal can be considered analogous to a wakeup event such as a keyboard keystroke or mouse movement. In a contemplated embodiment of the invention, ROM POST code functions to boot the computer system S and return the network interface controller to a normal operating mode following receipt of a wakeup event.

A Magic Packet™ frame for use with the disclosed embodiment includes sixteen duplications of the address of a particular network computer S, with no breaks or interruptions. The address sequence can be located anywhere within the Magic Packet™ frame, but is proceeded by a synchronization stream that simplifies the scanning state machine of the network interface controller 122. The synchronization frame is defined as six bytes of "FFh".

Preferably, the network interface controller 122 also accepts routed or MULTICAST frames including the sixteen duplications of the address matching the address of the targeted network computer S.

As an example, assume the address for a particular node on the network is 44h 55h 66h 77h 88h 99h. In this situation, the network interface controller 122 of that node scans for the following data sequence in an Ethernet frame: DESTINATION SOURCE MISC FF FF FF FF FF FF 44 55 66 77 88 99 44 55 66 77 88 99 44 55 66 77 88 99 44 55 66 77 88 99 44 55 66 77 88 99 44 55 66 77 88 99 44 55 66 77 88 99 44 55 66 77 88 99 44 55 66 77 88 99 44 55 66 77 88 99 44 55 66 77 88 99 44 55 66 77 88 99 44 55 66 77 88 99 44 55 66 77 88 99 MISC CRC.

Referring now to FIG. 3 a flowchart diagram illustrating generation of a secure network broadcast message in accordance with the present invention is shown. Following commencement of the procedure in step 300, control proceeds to step 302 where the network administrator or network management software creates a shutdown record for one or more network computers S. When implemented using the Magic Packet™ technology, the shutdown message includes the aforementioned specific data sequence addressing the desired network computers S and indicates to the network interface controllers 122 of these nodes that a Magic Packet™ frame is being broadcast. The shutdown record also includes a control code directing the desired network nodes to enter a low power state. Also included is a secure index (e.g., a time stamp indicating the date and time on which the shutdown record is created).

Control next proceeds to step 304 and a secure one-way hash function is performed on the shutdown record, resulting in a hash code representation of the record. In practice, public key algorithms, although capable, are often inefficient when used to sign long documents. In the preferred embodiment of the invention, this problem is addressed by generating a one-way hash of the shutdown record prior to encryption with the network administrator's public key. The hash value is commonly limited to a predetermined length.

Preferably, the one-way hash function is performed in a secure manner resistant to snooping or attack by malicious code. Contemplated methods for accomplishing the secure one-way hash function include those illustrated in the previously incorporated references entitled: "SECURE TWO-PIECE USER AUTHENTICATION IN A COMPUTER NETWORK" and "METHOD FOR SECURELY CREATING, STORING AND USING ENCRYPTION KEYS IN A COMPUTER SYSTEM".

Following completion of step 304, control next proceeds to step 306 and the secure hash code representation of the shutdown record is encrypted utilizing the network administrator's private key. Again, the encryption process is preferably performed in a secure manner. In essence, step 306 produces a digital signature of the shutdown record that is then appended to the original shutdown record in step 308. Control proceeds to step 310 and the encrypted hash of the shutdown record, in addition to the original shutdown record, is broadcast to a computer network such as that depicted in FIG. 2. Control then proceeds to optional step 312 and the network computers' S responses to the broadcast message are recorded.

Figure 4:
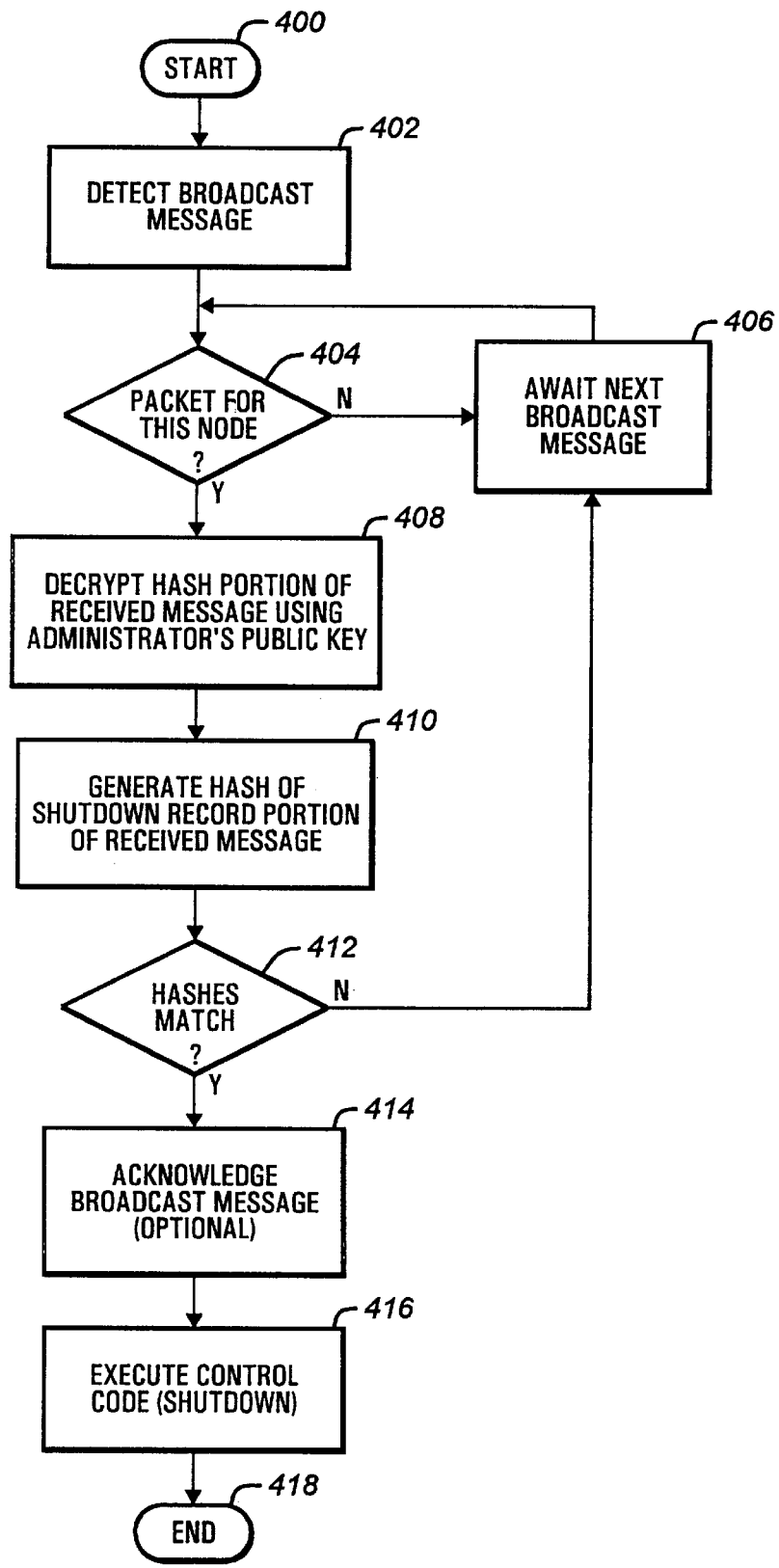
FIG. 4 is a flowchart diagram illustrating the receipt and validation of a secure network broadcast message in accordance with the present invention.

Referring now to FIG. 4, a flow chart diagram is provided illustrating the receipt and validation of the secure network broadcast message in accordance with the preferred embodiment of the present invention. This procedure is typically used to verify that the broadcast message was neither modified in transit nor originated from an unauthorized source. Following commencement of the procedure in step 400, control proceeds to step 402 where the network interface controller 122 of the network computer S detects and scans all broadcast messages (or incoming frames).

Following detection of a broadcast message, control proceeds to step 404 where the network interface controller 122 examines the broadcast message for a specific data sequence, indicating that the message contains a Magic Packet™ frame. The broadcast message is also examined to determine if it is addressed to the receiving network computer S. If not, control loops to step 406 and the network interface controller 122 awaits the next broadcast message.

If the receiving network computer S determines that the broadcast message is directed to it as determined in step 404, control proceeds to step 408 where the digital signature or encrypted hash portion of the received message is decrypted using the administrator's public key. Control next proceeds to step 410 where the network interface controller 122 or other system component performs a one-way hash function on the shutdown record portion of the received message. The decrypted hash of step 408 and the hash function result of step 410 are then compared in step 412. If the two hash values do not match, the broadcast message fails the verification process and control is returned to step 406 to await the next broadcast message. If the broadcast message is validated as secure in step 412, control proceeds to step 414 and the receiving network computer S broadcasts an optional acknowledgement message. Control proceeds to step 416 and the shutdown control code of the broadcast message is executed by the receiving network computer S, which either enters a low power state, awakens, or performs some other predetermined function. The verification process is ended step in 418.

For machines in which it is desirable to disable remote control functionality, it is contemplated that the public key of the network administrator can be invalidated such that the specified machine is incapable of detecting a valid broadcast message. This may be desirable for use with network components containing critical or highly sensitive information.

Thus, a method has been described for providing secure remote control commands in a distributing computer environment. In the preferred embodiment of the invention, the network administrator or network management software creates a shutdown record, including an index or time stamp, for powering down a specified network computer(s). Prior to broadcast over the network, a secure one-way hash function is performed on the shutdown record. The result of the one-way hash function is encrypted using the network administrator's private key, thereby generating a digital signature that can be verified by specially configured network nodes. The digital signature is appended to the original shutdown record prior to broadcast to the network. Upon receiving the broadcast message, the targeted network computer validates the broadcast message by verifying the digital signature of the packet or frame. The shutdown record or other command code is only executed following authentication of the broadcast message.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for securely broadcasting remote control commands in a computer network including at least one targeted network computer capable of responding to remote control commands from a network administrator computer or other network computer, the method comprising the steps of:

generating a remote control command;

creating a digital signature of the remote control command;

appending the digital signature to the remote control command to create a broadcast message; and communicating the broadcast message to at least one targeted network computer.

2. The method of claim 1, wherein the step of creating a digital signature of the remote control command comprises:

performing a one-way hash function on the remote control command to generate a signature hash value; and encrypting the signature hash value with a private key.

3. The method of claim 2, wherein the targeted network computer(s) further performs the steps of:

decrypting the signature hash value portion of the broadcast message using a public key corresponding to the private key, performing a one-way hash function on the remote control command portion of the broadcast message to generate a verification hash value; and comparing the decrypted signature hash value with the verification hash value.

4. The method of claim 3, wherein the targeted network computer(s) further performs the step of:

executing the remote control command only if the signature hash value and the verification hash value are identical.

5. The method of claim 4, wherein the step of communicating the broadcast message to at least one targeted network computer is substantially compliant with the Magic Packet™ specification.

6. The method of claim 4, wherein the remote control command includes an index or time stamp.

7. The method of claim 4, wherein the remote control command directs the targeted network computer to enter a low power state.

8. The method of claim 4, wherein the remote control command directs the targeted network computer to enter a fully powered state.

9. The method of claim 2, wherein the private key is maintained in secure memory space.

10. The method of claim 3, farther comprising the step of invalidating the public key corresponding to the private key in at least one network computer such that predetermined remote control commands cannot be validated.

11. The method of claim 1, wherein the targeted network computer(s) further performs the steps of:

utilizing the digital signature to verify that the broadcast message is authorized; and executing the remote control command only if the broadcast message is authentic and authorized.

12. The method of claim 11, wherein the step of communicating the broadcast message to at least one targeted network computer is substantially compliant with the Magic Packet™ specification.

13. The method of claim 12, wherein the remote control command directs the targeted network computer to enter a low power state.

14. The method of claim 12, wherein the remote control command directs the targeted network computer to enter a fully powered state.

15. The method of claim 1, wherein the remote control command includes an index or time stamp.

16. The method of claim 1, wherein the digital signature is generated during a secure mode of operation or in secure computer memory.

17. A computer system configured to receive secure network communications, the secure network communications having a remote control command and a digital signature, the computer system comprising:

a system bus;

a processor coupled to the system bus;

power management hardware or software; and network interface circuitry coupled to the system bus and the power management hardware or software, the network interface circuitry configured to perform or direct the steps of:

utilizing the digital signature to verify that the broadcast message is authentic; and permitting the execution of the remote control command only if the broadcast message is authentic, wherein the remote control command causes a change in state in the power management hardware or software.

18. The computer system of claim 17, wherein the change in state in the power management hardware or software causes the computer system to enter a low power mode.

19. The computer system of claim 17, wherein the change in state in the power management hardware or software causes the computer system to become fully powered.

20. The computer system of claim 17, wherein the digital signature comprises a hash code representation of the remote control command, the hash code representation encrypted with a private key, and wherein the step of utilizing the digital signature to verify that the broadcast message is authentic comprises:

decrypting the signature hash code representation of the broadcast message using a public key corresponding to the private key;

performing a one-way hash function on the remote control command portion of the broadcast message to generate a verification hash value; and comparing the decrypted hash code representation of the broadcast message with the verification hash value.

21. The computer system of claim 17, wherein the network interface circuitry is further configured to substantially comply with the Magic Packet™ specification.

22. The computer system of claim 17, further comprising a non-writeable secure memory space coupled to the processor, wherein the public key is maintained in the secure memory space.

23. A computer system configured to broadcast secure computer network communications, the computer system comprising:

a system bus;

a processor coupled to the system bus;

a processor readable storage medium coupled to the system bus for directing the processor to perform the steps of generating a remote control command;

creating a digital signature of the remote control command; and appending the digital signature to the remote control command to create a broadcast message;

network interface circuitry coupled to the system bus, the network interface circuitry responsive to a command(s) from the processor to transmit the broadcast message to a computer network.

24. The computer system of claim 23, wherein the step of creating a digital signature of the remote control command comprises the steps of:

performing a one-way hash function on the remote control command to generate a signature hash value; and encrypting the signature hash value with a private key.

25. The computer system of claim 23, wherein the broadcast message is substantially compliant with the Magic Packet™ specification.

26. The computer system of claim 23, wherein the remote control command includes an index or time stamp.

27. The computer system of claim 23, further comprising a secure memory space coupled to the processor, wherein the private key is maintained in the secure memory space.

28. A computer system configured to receive secure network communications, the secure network communications having a remote control command and a digital signature, the computer system comprising:

a system bus;

a processor coupled to the system bus;

a mass storage device coupled to the system bus;

power management hardware or software; and network interface circuitry coupled to the system bus and the power management hardware or software, the network interface circuitry configured to perform or direct the steps of:

utilizing the digital signature to verify that the broadcast message is authentic; and permitting the execution of the remote control command only if the broadcast message is authentic, wherein the remote control command causes a change in state in the power management hardware or software.

29. The computer system of claim 28, wherein the change in state in the power management hardware or software causes the computer system to enter a low power mode.

30. The computer system of claim 28, wherein the change in state in the power management hardware or software causes the computer system to become fully powered.

31. The computer system of claim 28, wherein the digital signature comprises a hash code representation of the remote control command, the hash code representation encrypted with a private key, and wherein the step of utilizing the digital signature to verify that the broadcast message is authentic comprises:

decrypting the signature hash code representation of the broadcast message using a public key corresponding to the private key;

performing a one-way hash function on the remote control command portion of the broadcast message to generate a verification hash value; and comparing the decrypted hash code representation of the broadcast message with the verification hash value.

32. The computer system of claim 28, wherein the network interface circuitry is further configured to substantially comply with the Magic Packet™ specification.

33. A computer system configured to broadcast secure computer network communications, the computer system comprising:

a system bus;

a processor coupled to the system bus;

a mass storage device coupled to the system bus;

a processor readable storage medium coupled to the system bus for directing the processor to perform the steps of:

generating a remote control command;

creating a digital signature of the remote control command; and appending the digital signature to the remote control command to create a broadcast message;

network interface circuitry coupled to the system bus, the network interface circuitry responsive to a command(s) from the processor to transmit the broadcast message to a computer network.

34. The computer system of claim 33, wherein the step of creating a digital signature of the remote control command comprises the steps of:

performing a one-way hash function on the remote control command to generate a signature hash value; and encrypting the signature hash value with a private key.

35. The computer system of claim 33, wherein the broadcast message is substantially compliant with the Magic Packet™ specification.

36. The computer system of claim 33, wherein the remote control command includes an index or time stamp.

37. The computer system of claim 33, further comprising a secure memory space coupled to the processor, wherein the private key is maintained in the secure memory space.

38. A method for securely broadcasting remote control commands in a computer network including at least one targeted network computer capable of responding remote control commands from a network administrator computer or other network computer and capable of power management, the method comprising the steps of:

generating a remote control command for power management;

creating a digital signature of the remote control command;

appending the digital signature to the remote control command to create a broadcast message;

communicating the broadcast message to at least one targeted network computer; and changing the state of power management hardware or software in the targeted network computer responsive to the remote control command only if the broadcast message is authentic.

39. The method of claim 38, wherein tie step of creating a digital signature of the remote control command comprises:

performing a one-way hash function on the remote control command to generate a signature hash value; and encrypting the signature hash value with a private key.

40. The method of claim 39, wherein the targeted network computer(s) further performs the steps of:

decrypting the signature hash value portion of the broadcast message using public key corresponding to the private key;

performing a one-way hash function on the remote control command portion of the broadcast message to generate a verification hash value; and comparing the decrypted signature hash value with the verification hash value.

41. The method of claim 40, wherein the targeted network computer(s) further performs the steps of:

executing the remote control command only if the signature hash value and the verification hash value are identical.

42. The method of claim 41, wherein the step of communicating the broadcast message to at least one targeted network computer is substantially compliant with the Magic Packet™ specification.

43. The method of claim 41, wherein the remote control command includes an index or time stamp.

44. The method of claim 41, wherein the remote control command directs the targeted network computer to enter a low power state.

45. The method of claim 41, wherein the remote control command directs the targeted network computer to enter a fully powered state.

46. The method of claim 39, wherein the private key is maintained in secure memory space.

47. The method of claim 40, further comprising the step of invalidating the public key corresponding to the private key in at least one network computer such that predetermined remote control commands cannot be validated.

48. The method of claim 38, wherein the targeted network computer(s) further performs the steps of:

utilizing the digital signature to verify that the broadcast message is authorized; and executing the remote control command only if the broadcast message is authentic and authorized.

49. The method of claim 48, wherein the step of communicating the broadcast message to at least one targeted network computer is substantially compliant with the Magic Packet™ specification.

50. The method of claim 49, wherein the remote control command directs the targeted network computer to enter a low power state.

51. The method of claim 49, wherein the remote control command directs the targeted network computer to enter a fully powered state.

52. The method of claim 38, wherein the remote control command includes an index or time stamp.

53. The method of claim 38, wherein the digital signature is generated during a secure mode of operation or in secure computer memory.

* * * * *